(12) United States Patent
Tanaka

(10) Patent No.: US 11,573,246 B2
(45) Date of Patent: Feb. 7, 2023

(54) INERTIAL SENSOR AND INERTIAL MEASUREMENT UNIT

(71) Applicant: Seiko Epson Corporation, Tokyo (JP)

(72) Inventor: Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/389,462

(22) Filed: Jul. 30, 2021

(65) Prior Publication Data
US 2022/0034935 A1    Feb. 3, 2022

(30) Foreign Application Priority Data

Jul. 31, 2020  (JP) .............................. JP2020-130103

(51) Int. Cl.
*G01P 15/125*   (2006.01)
(52) U.S. Cl.
CPC ................. *G01P 15/125* (2013.01)
(58) Field of Classification Search
CPC ................................................. G01P 15/125
See application file for complete search history.

(56) References Cited

U.S. PATENT DOCUMENTS

| | | | |
|---|---|---|---|
| 2010/0089154 A1 | 4/2010 | Ballas et al. | |
| 2011/0023604 A1 | 2/2011 | Cazzaniga et al. | |
| 2013/0042684 A1 | 2/2013 | Yoda | |
| 2015/0020591 A1* | 1/2015 | Tanaka ................ | G01P 15/125 73/514.32 |

FOREIGN PATENT DOCUMENTS

| | | |
|---|---|---|
| EP | 2284488 A1 | 2/2011 |
| JP | 2010-089254 A | 4/2010 |
| JP | 2013-040856 A | 2/2013 |

* cited by examiner

*Primary Examiner* — Walter L Lindsay, Jr.
*Assistant Examiner* — Andrew V Do
(74) *Attorney, Agent, or Firm* — Hamess, Dickey & Pierce, P.L.C.

(57) ABSTRACT

An inertial sensor includes: a substrate; a fixing part arranged at one surface of the substrate; a moving element having an opening and configured to swing about a rotation axis along a first direction; a support beam supporting the moving element as the rotation axis in the opening of the moving element; and a support part supporting the support beam. The support part includes a first part fixed to the fixing part, and a second part formed only of a part not fixed to the fixing part. A length in the first direction of the second part is longer than a length in the first direction of the first part.

12 Claims, 13 Drawing Sheets

INERTIAL SENSOR AND INERTIAL MEASUREMENT UNIT

The present application is based on, and claims priority from JP Application Serial Number 2020-130103, filed Jul. 31, 2020, the disclosure of which is hereby incorporated by reference herein in its entirety.

BACKGROUND

1. Technical Field

The present disclosure relates to an inertial sensor and an inertial measurement unit.

2. Related Art

Recently, an inertial sensor manufactured using the MEMS (micro-electro-mechanical systems) technology has been developed. As such an inertial sensor, for example, JP-A-2013-40856 describes an acceleration sensor that includes a base substrate, a sensor part which is a moving element seesawing about a rotation axis along a vertical direction in relation to the base substrate, and a fixed electrode part provided at the substrate, and that can detect an acceleration in the vertical direction, based on a change in electrostatic capacitance between a first part and a second part having moving electrode parts with different moments of rotation about the rotation axis from each other, of the sensor part, and a fixed electrode part arranged at a position opposite each of these parts.

However, in the acceleration sensor described in JP-A-2013-40856, the two support parts serving as the axes of rotation and fixed to the base substrate are arranged on both sides of the sensor part and are thus widely spaced apart from each other. Therefore, susceptibility to the influence of a warp of the base substrate due to an external stress or a thermal stress may cause a drop in the detection accuracy of the acceleration sensor.

SUMMARY

An inertial sensor includes: a substrate; a fixing part arranged at one surface of the substrate; a moving element having an opening and configured to swing about a rotation axis along a first direction; a support beam supporting the moving element as the rotation axis in the opening of the moving element; and a support part supporting the support beam. The support part includes a first part fixed to the fixing part, and a second part formed only of a part not fixed to the fixing part. A length in the first direction of the second part is longer than a length in the first direction of the first part.

An inertial measurement unit includes: the foregoing inertial sensor; and a control unit performing control based on a detection signal outputted from the inertial sensor.

DESCRIPTION OF EXEMPLARY EMBODIMENTS

1. First Embodiment

First, an inertial sensor 1 according to a first embodiment will be described, taking an acceleration sensor detecting an acceleration in the vertical direction as an example and with reference to FIGS. 1, 2, and 3.

Figure 1:
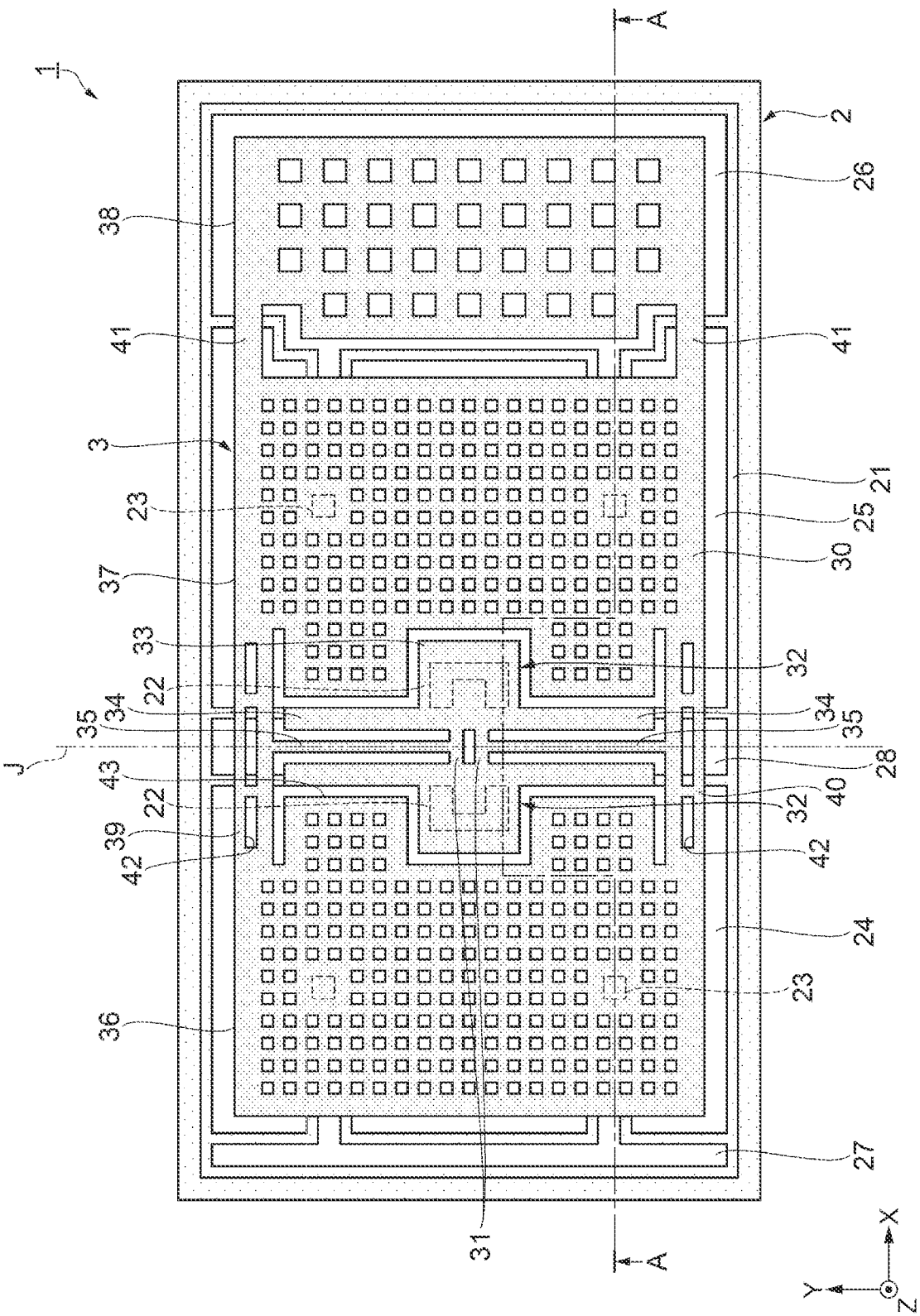
FIG. 1 is a plan view showing a schematic structure of an inertial sensor according to a first embodiment.

FIG. 1 shows the state where a lid 5 is removed, for the sake of convenience of the description of the internal configuration of the inertial sensor 1.

Also, for the sake of convenience of the description, an X-axis, a Y-axis, and a Z-axis are shown as three axes orthogonal to each other in each drawing. A direction parallel to the X-axis is referred to as an "X-direction". A direction parallel to the Y-axis is referred to as a "Y-direction". A direction parallel to the Z-axis is referred to as a "Z-direction". The head side of the arrow along each axial direction is referred to as a "positive side". The base side is referred to as a "negative side". The positive side along the Z-direction is referred to as "up". The negative side along the Z-direction is referred to as "down". The Z-direction is along the vertical direction. The XY plane is along the horizontal plane. A first direction in this embodiment is the Y-direction. A second direction is the X-direction. A third direction is the Z-direction.

Figure 2:
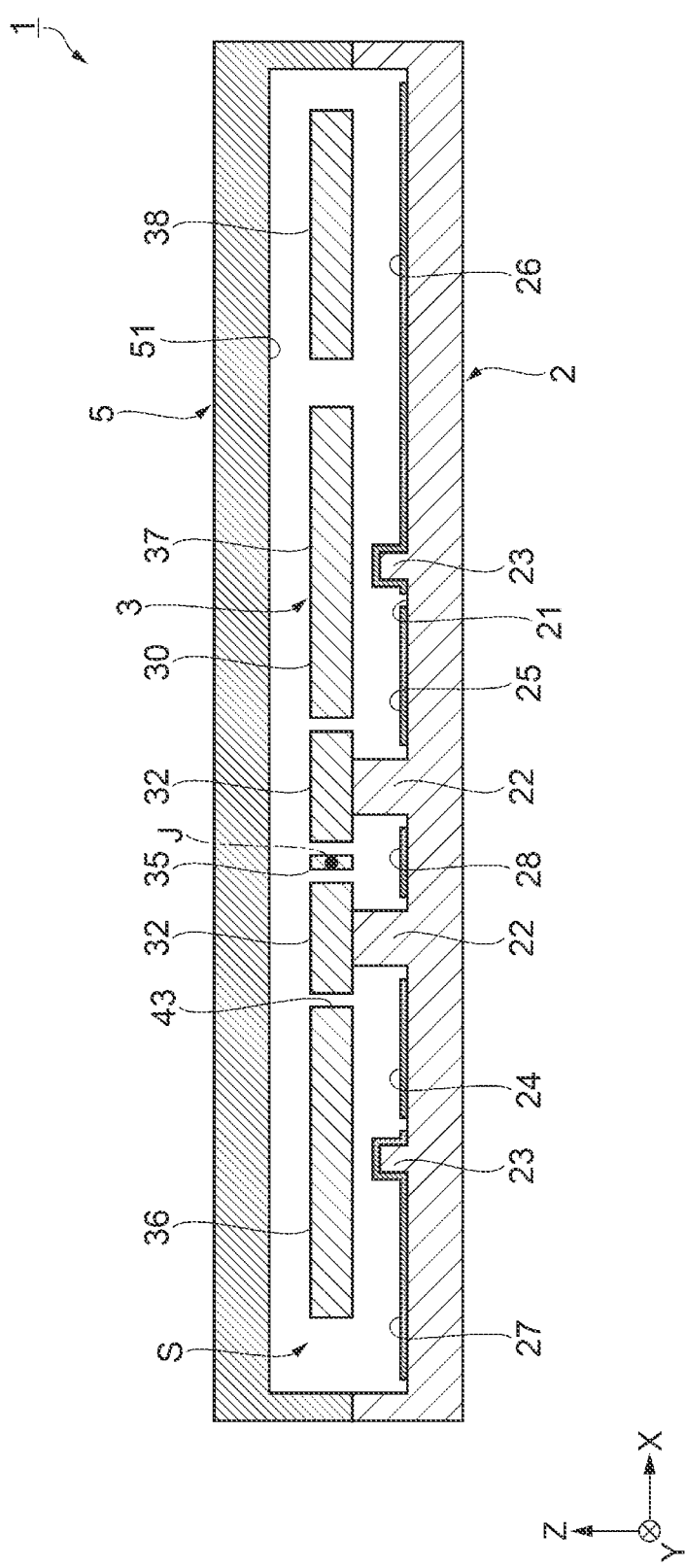
FIG. 2 is a cross-sectional view taken along line A-A in FIG. 1.

The inertial sensor 1 shown in FIGS. 1 and 2 can detect an acceleration in the Z-direction, which is the vertical direction of a sensor element 3. Such an inertial sensor 1 has a substrate 2, a sensor element 3 arranged at the top of the substrate 2, and a lid 5 bonded to the substrate 2 and covering the sensor element 3.

As shown in FIG. 1, the substrate 2 expands in the X-direction and the Y-direction and has a thickness in the Z-direction. As shown in FIG. 2, a recess 21 open to an upper surface side is formed on the substrate 2. As viewed in a plan view from the Z-direction, the recess 21 contains the sensor element 3 inside and is formed to be larger than the sensor element 3. The recess 21 functions as a clearance part that restrains contact between the sensor element 3 and the substrate 2. The substrate 2 also has a fixing part 22 and a protrusion 23 that are arranged at a bottom surface of the recess 21 forming one surface of the substrate 2 and that protrude toward the sensor element 3 from the bottom surface. The substrate 2 has a first detection electrode 24, a second detection electrode 25, and a dummy electrode 26 that are arranged at the bottom surface of the recess 21 and that overlap the sensor element 3, as viewed in a plan view from the Z-direction. The sensor element 3 is bonded to an upper surface of the fixing part 22. The protrusion 23 is arranged at a position overlapping a moving element 30, as viewed in a plan view from the Z-direction. In this embodiment, the first detection electrode 24, the second detection electrode 25, and the dummy electrode 26 are fixed electrodes.

The protrusion 23 functions as a stopper that comes into contact with the moving element 30 when the moving element 30 seesaws excessively, and thus regulates further seesawing of the moving element 30. Providing such a protrusion 23 can restrain excessive approach or contact over a broad area, between the moving element 30, and the first detection electrode 24 and the second detection electrode 25, which have different electric potentials from each other. This can effectively restrain the occurrence of a "sticking" of the moving element 30 being left attracted to the first detection electrode 24 and the second detection electrode 25 due to an electrostatic attraction generated between the moving element 30, and the first detection electrode 24 and the second detection electrode 25.

As the substrate 2, a glass substrate formed of, for example, a glass material containing an alkali metal ion, which is a mobile ion such as Nat, for example, a borosilicate glass such as Pyrex (trademark registered) glass or Tempax (trademark registered) glass can be used. However, the substrate 2 is not particularly limited and may be, for example, a silicon substrate or a ceramic substrate.

As shown in FIG. 2, a recess 51 open to a lower surface side is formed on the lid 5. The lid 5 accommodates the sensor element 3 in the recess 51 and is bonded to the upper surface of the substrate 2. The lid 5 and the substrate 2 together form an accommodation space S accommodating the sensor element 3 inside. The accommodation space S is an airtight space. An inert gas such as nitrogen, helium or argon is sealed in the accommodation space S. Preferably, the accommodation space S has a substantially barometric pressure at operating temperatures of approximately −40° C. to 125° C. However, the atmosphere in the accommodation space S is not particularly limited and may be, for example, a pressure-reduced state or a pressurized state.

As the lid 5, for example, a silicon substrate can be used. However, the lid 5 is not particularly limited to this and may be, for example, a glass substrate or a ceramic substrate. The method for bonding the substrate 2 and the lid 5 is not particularly limited. A suitable method may be selected according to the materials of the substrate 2 and the lid 5. For example, anodic bonding, activated bonding in which bonding surfaces activated by plasma irradiation are bonded together, bonding with a bonding material such as a glass frit, diffusion bonding in which metal films formed at the upper surface of the substrate 2 and the lower surface of the lid 5 are bonded together, or the like, can be used.

The sensor element 3 is formed, for example, by patterning an electrically conductive silicon substrate doped with an impurity such as phosphorus (P), boron (B), or arsenic (As), by etching, particularly, by the Bosch process, which is a deep-etching technique. As shown in FIGS. 1 and 3, the sensor element 3 has a moving element 30 having an opening 43 and configured to swing about a rotation axis J along the Y-direction, a support beam 35 supporting the moving element 30 as the rotation axis J, and a support part 32 supporting the support beam 35.

The moving element 30 has a rectangular shape having a longitudinal direction along the X-direction as viewed in a plan view from the Z-direction. The moving element 30 has a first mass part 36 and a second mass part 37 arranged on both sides of the support beam 35, which is the rotation axis J, as viewed in a plan view from the Z-direction, and a third mass part 38 coupled to the second mass part 37 via a third coupling part 41 at both ends along the Y-direction of an end part on the side opposite to the first mass part 36 along the X-direction, of the second mass part 37. The first mass part 36 is located on the negative side along the X-direction in relation to the rotation axis J. The second mass part 37 and the third mass part 38 are located on the positive side along the X-direction in relation to the rotation axis J. The first mass part 36 and the second mass part 37 are coupled together via a first coupling part 39 and a second coupling part 40 at both ends along the Y-direction of an end part on the side where these mass parts face each other.

The total length in the X-direction of the second mass part 37 and the third mass part 38 is longer than the length in the X-direction of the first mass part 36. At the second mass part 37, the moment of rotation about the rotation axis J generated when an acceleration Az in the Z-direction is applied is greater than at the first mass part 36. This difference in the moment of rotation causes the moving element 30 to seesaw about the rotation axis J when the acceleration Az is applied. The seesawing means that the second mass part 37 is displaced to the negative side along the Z-direction when the first mass part 36 is displaced to the positive side along the Z-direction, whereas the second mass part 37 is displaced to the positive side along the Z-direction when the first mass part 36 is displaced to the negative side along the Z-direction.

The moving element 30 also has a plurality of penetration holes formed evenly over its entire area, for example, arrayed regularly. This can reduce damping due to viscosity. However, the penetration holes may be omitted, may be not evenly arranged, or may be not uniformly sized.

Inside the opening 43 formed by the first mass part 36, the second mass part 37, the first coupling part 39, and the second coupling part 40, the support part 32 which is, for example, anodically bonded and fixed to the fixing part 22, and the support beam 35 acting as the rotation axis J and supporting the moving element 30, are arranged. Therefore, the fixing part 22 provided in the substrate 2 is arranged inside the opening 43, that is, inside the sensor element 3, and is therefore less susceptible to the influence of the warp of the substrate 2. Thus, the drop in the detection accuracy of the inertial sensor 1 can be reduced. Also, the sensor element 3 can be miniaturized. In this embodiment, two fixing parts 22 and two support parts 32 are arranged on both sides of the support beam 35.

The support part 32 has a first part 33 having an area fixed to the fixing part 22 at a position overlapping the fixing part 22 as viewed in a plan view from the Z-direction, and a second part 34 formed only of a part not fixed to the fixing part 22 and extending to the positive side along the Y-direction and a second part 34 formed only of a part not fixed to the fixing part 22 and extending to the negative side along the Y-direction, the second parts 34 being located between the first part 33, and the first coupling part 39 and the second coupling part 40. As shown in FIG. 3, a length L2 in the Y-direction of the second part is longer than a length L1 in the Y-direction of the first part 33. The support parts 32 are located between the first coupling part 39 and the second coupling part 40 and are arranged next to each other via a groove that forms a part of the first coupling part 39, the second coupling part 40, and the opening 43. In this embodiment, the length in the X-direction of the first part 33 is longer than the length in the X-direction of the second part 34.

In the sensor element 3 in this embodiment, the length L2 of the second part 34 is longer than the length L1 of the first part 33, and the second part 34 is arranged between the first part 33, and the first coupling part 39 and the second coupling part 40. Therefore, when an impact in the in-plane direction is applied, the end parts on the side of the first coupling part 39 and the second coupling part 40 of the support beam 35 having a large amount of displacement, and the second part 34 having elasticity, come into contact with each other. This makes it easier to absorb the impact and can improve in-plane impact resistance. Also, the support part 32 is long in the Y-direction between the first coupling part 39 and the second coupling part 40. Therefore, when the impact in the in-plane direction is applied, a large contact area between the support part 32 and the support beam 35 can be secured and the impact on the support beam 35 can be restrained further.

In the sensor element 3, a length L3 in the X-direction from the support part 32 to the support beam 35 is longer than a length L4 in the X-direction from the support part 32 to the first mass part 36 and the second mass part 37. Therefore, when the impact in the in-plane direction is applied, the first mass part 36 and the second mass part 37, and the support part 32, come into contact with each other first because the space between the support part 32, and the first mass part 36 and the second mass part 37, is narrower. Thus, damage to the support beam 35 can be prevented.

The support beam 35 is coupled to coupling beams 31 coupling the two support parts 32. At the coupling beam 31 on the side of the first coupling part 39, the support beam 35 extending to the positive side along the Y-direction and coupled to the first coupling part 39 is provided. At the coupling beam 31 on the side of the second coupling part 40, the support beam 35 extending to the negative side along the Y-direction and coupled to the second coupling part 40 is provided. This enables the moving element 30 to swing about the two support beams 35 as the rotation axis J.

The support beam 35 is coupled via the coupling beam 31 to the first part 33 having no elasticity of the support part 32 fixed to the fixing part 22. Therefore, when an impact such as a falling impact is applied, the influence of the impact can be significantly reduced and damage to the support beam 35 can be prevented.

In the moving element 30, the position where the first mass part 36 and the second mass part 37 face the second part 34 of the support part 32 is closer to the support beam 35 than the position where the first mass part 36 and the second mass part 37 face the first part 33. That is, as shown in FIG. 3, a length Lm in the X-direction from the end part facing the second part 34, of the moving element 30, to the rotation axis J is shorter than a length Lc in the X-direction from the end part opposite to the side of the rotation axis J, of the first part 33, to the rotation axis J. Therefore, facing areas of the first mass part 36 and the second mass part 37 facing the first detection electrode 24 and the second detection electrode 25 can be increased. This can improve the sensitivity of detection.

In each of the first coupling part 39 and the second coupling part 40, three penetration holes 42 are arranged along the X-direction. As shown in FIG. 3, a length La in the X-direction from the rotation axis J to the end part on the side of the moving element 30, of the first coupling part 39 and the second coupling part 40, is longer than the length Lm in the X-direction from the rotation axis J to the end part facing the second part 34, of the moving element 30. Securing the long length La of the first coupling part 39 and the second coupling part 40 can maintain the improvement in in-plane impact resistance, make it easier for the moving element 30 to flex, and improve out-of-plane impact resistance.

Next, the first detection electrode 24, the second detection electrode 25, and the dummy electrode 26 arranged at the bottom surface of the recess 21 will be described.

As shown in FIGS. 1 and 2, the first detection electrode 24 is arranged overlapping the first mass part 36, and the second detection electrode 25 is arranged overlapping the second mass part 37, as viewed in a plan view from the Z-direction. The first detection electrode and the second detection electrode 25 are provided substantially symmetrically about the rotation axis J, as viewed in a plan view from the Z-direction, so that electrostatic capacitances of these electrodes, described later, are equal to each other in a natural state where the acceleration Az is not applied.

The dummy electrode 26 is located further to the positive side along the X-direction than the second detection electrode 25 and is provided overlapping the third mass part 38. Covering the bottom surface of the recess 21 with the dummy electrode 26 in this way can restrain the bottom surface of the recess 21 from being charged due to the migration of alkali metal ions in the substrate 2. Therefore, an unintended electrostatic attraction that may lead to the malfunction of the moving element 30 can be effectively restrained from occurring between the bottom surface of the recess 21 and the second mass part 37. Thus, the inertial sensor 1 can detect the acceleration Az more accurately.

The dummy electrode 26 is electrically coupled to an electrode at the upper surface of the protrusion 23 provided at the position overlapping the second mass part 37, as viewed in a plan view from the Z-direction. An electrode at the upper surface of the protrusion 23 provided at the position overlapping the first mass part 36, as viewed in a plan view from the Z-direction, is electrically coupled to a wiring 27 provided on the side of the first mass part 36. An electrode at the upper surface of the fixing part 22 for applying a drive voltage to the sensor element 3 is electrically coupled to a wiring 28 provided at a position overlapping the support beam 35 as viewed in a plan view from the Z-direction. Therefore, causing the dummy electrode 26, the wiring 27, and the wiring 28 to have the same electric potential can reduce the occurrence of the sticking when the sensor element 3 and the electrode at the upper surface of the protrusion 23 come into contact with each other due to excessive seesawing. In this embodiment, the electrode at the upper surface of the protrusion 23 is electrically coupled to the dummy electrode 26 or the like. However, the electrode at the upper surface of the protrusion 23 may be electrically coupled to the first detection electrode 24 and the second detection electrode 25. In this case, an insulation layer or the like may be provided on the surface of the electrode at the upper surface of the protrusion 23 in order to prevent the occurrence of the sticking.

To drive the inertial sensor 1, a drive voltage is applied to the sensor element 3 via the wiring 28, the first detection electrode 24 and a QV amplifier are coupled together via a wiring, not illustrated, and the second detection electrode 25 and another QV amplifier are coupled together via a wiring, not illustrated. Thus, an electrostatic capacitance is formed between the first mass part 36 and the first detection electrode 24, and an electrostatic capacitance is formed between the second mass part 37 and the second detection electrode 25. The two electrostatic capacitances are substantially equal to each other in a natural state where the acceleration Az is not applied.

When the acceleration Az is applied to the inertial sensor 1, the moving element 30 seesaws about the rotation axis J. This seesawing of the moving element 30 causes the gap between the first mass part 36 and the first detection electrode 24 and the gap between the second mass part 37 and the second detection electrode 25 to change in the opposite phases. The two electrostatic capacitances change in the opposite phases accordingly. Thus, the inertial sensor 1 can detect the acceleration Az, based on the change in the two electrostatic capacitances.

In the inertial sensor 1 according to this embodiment, the fixing part 22 provided at the substrate 2 is arranged in the opening 43, that is, inside the sensor element 3, and is therefore less susceptible to the influence of the warp of the substrate 2. Thus, the drop in the detection accuracy of the inertial sensor 1 can be reduced.

The length L2 of the second part 34 is longer than the length L1 of the first part 33. The second part 34 is arranged between the first part 33, and the first coupling part 39 and the second coupling part 40. Therefore, when an impact in the in-plane direction is applied, the end parts on the side of the first coupling part 39 and the second coupling part 40 of the support beam 35 having a large amount of displacement, and the second part 34 having elasticity, come into contact with each other. This makes it easier to absorb the impact and can improve in-plane impact resistance. The total length in the Y-direction of the plurality of second parts 34 arranged next to each other along the Y-direction is longer than the total length in the Y-direction of the first parts 33 arranged next to each other along the Y-direction with the second parts 34.

2. Second Embodiment

Figure 4:
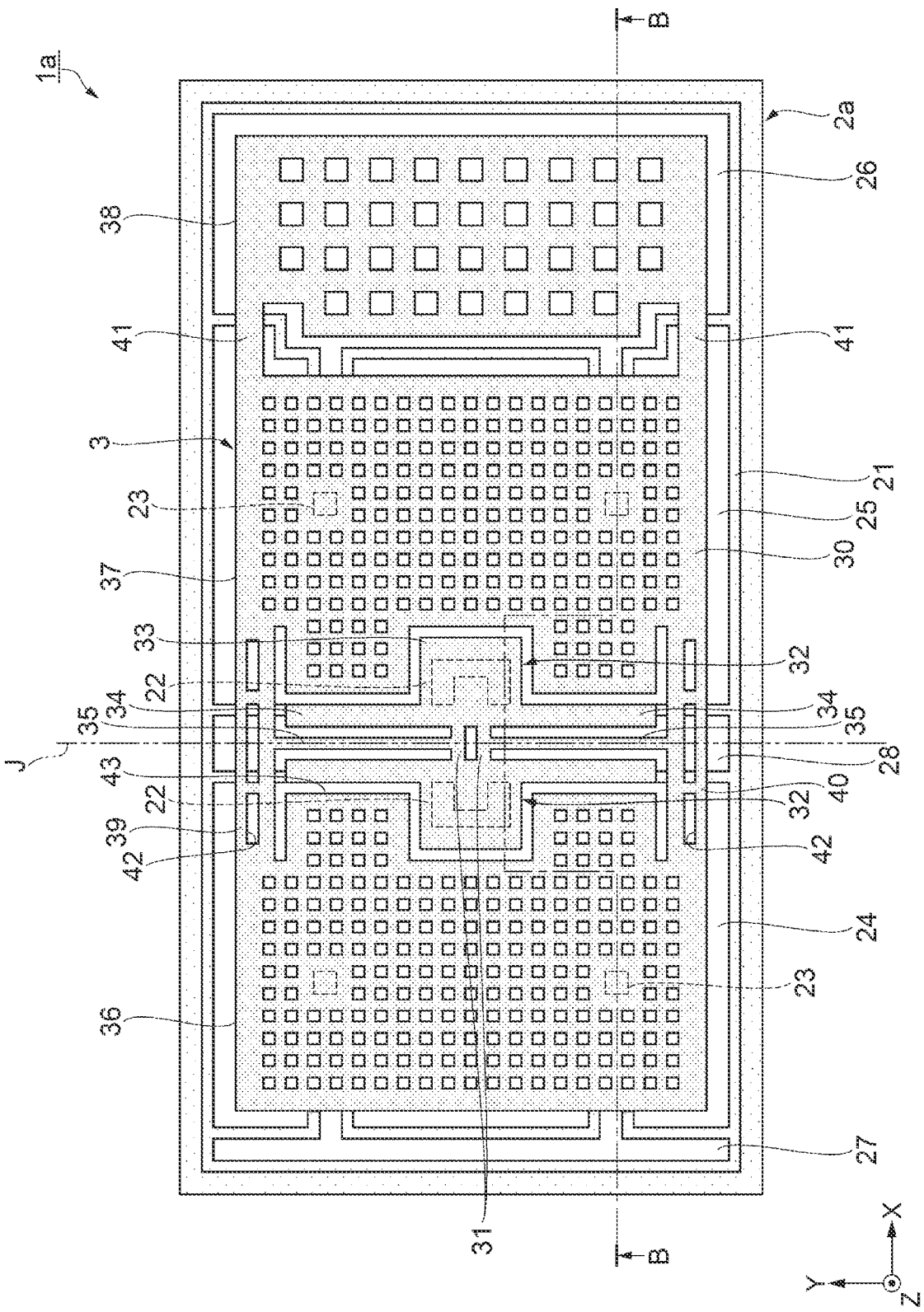
FIG. 4 is a plan view showing a schematic structure of an inertial sensor according to a second embodiment.

An inertial sensor 1a according to a second embodiment will now be described with reference to FIGS. 4 and 5. FIG. 4 shows the state where the lid 5 is removed for the sake of convenience of the description of the internal configuration of the inertial sensor 1a.

The inertial sensor 1a according to this embodiment is similar to the inertial sensor 1 according to the first embodiment, except that the structure of a substrate 2a is different from that in the inertial sensor 1 according to the first embodiment. This embodiment is described mainly in terms of its difference from the first embodiment. The description of similar matters is omitted.

Figure 5:
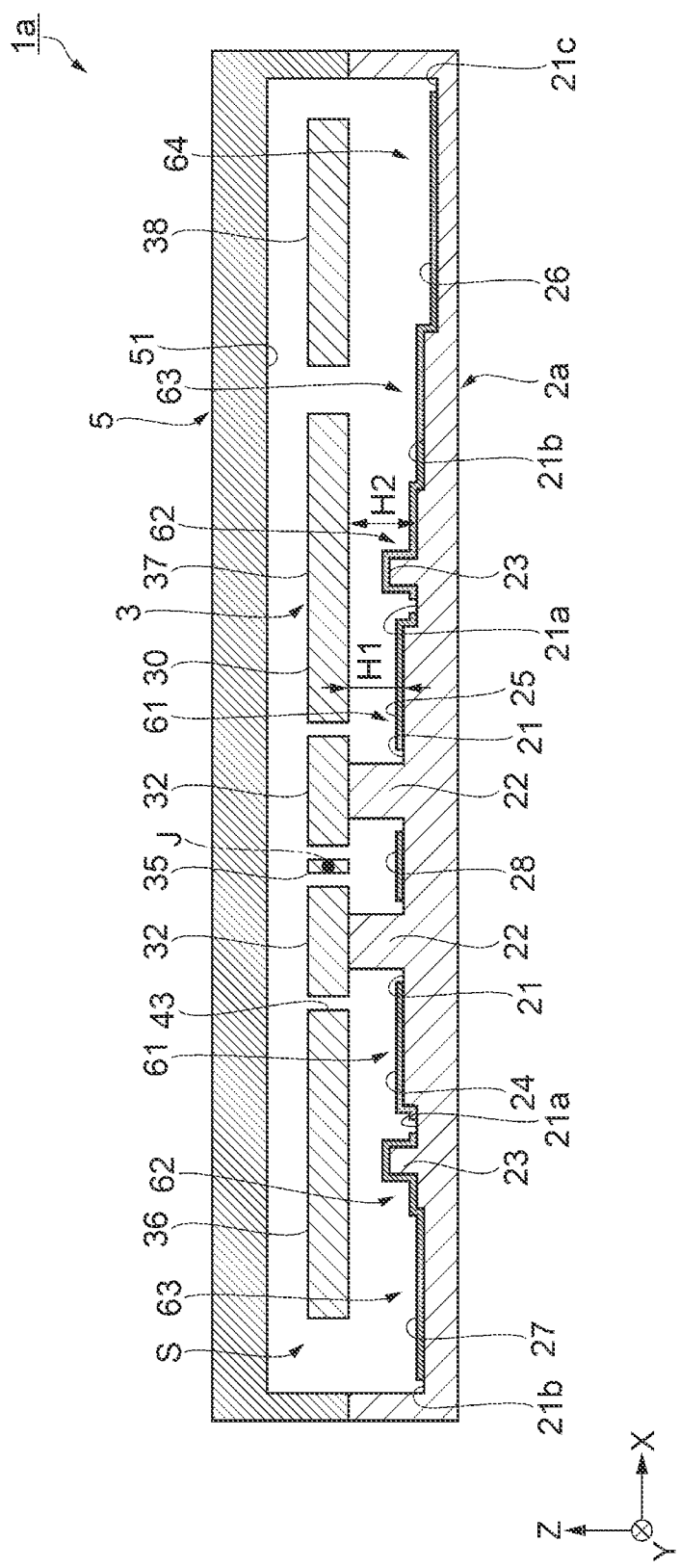
FIG. 5 is a cross-sectional view taken along line B-B in FIG. 4.

As shown in FIGS. 4 and 5, on the substrate 2a of the inertial sensor 1a, a recess 21 open to the upper surface side, a recess 21a open to the upper surface side at the bottom surface of the recess 21, a recess 21b open to the upper surface side at the bottom surface of the recess 21a, and a recess 21c open to the upper surface side at the bottom surface of the recess 21b are formed. At the bottom surface of the recess 21, a fixing part 22 protruding to the upper surface side, a first detection electrode 24, a second detection electrode 25, and a wiring 28 are arranged. At the bottom surface of the recess 21a, a protrusion 23 protruding to the upper surface side, the first detection electrode 24, the second detection electrode 25, a wiring 27 electrically coupled to the electrode provided at the upper surface of the protrusion 23, and a dummy electrode 26 electrically coupled to the electrode provided at the upper surface of the protrusion 23 are arranged. At the bottom surface of the recess 21b, the first detection electrode 24, the second detection electrode 25, the dummy electrode 26, and the wiring 27 are arranged. At the bottom surface of the recess 21c, the dummy electrode 26 is arranged.

The moving element 30 is arranged, spaced apart from the first detection electrode 24, the second detection electrode 25, and the dummy electrode 26 by a first gap 61, a second gap 62, a third gap 63, and a fourth gap 64 having different spaces from each other between the moving element 30 and the fixed electrode of the gap, in the areas where the moving element 30 faces the first detection electrode 24, the second detection electrode 25, and the dummy electrode 26, which are the fixed electrodes.

The first gap 61 is arranged nearer to the rotation axis J than the second gap 62. The first gap 61, the second gap 62, the third gap 63, and the fourth gap 64 are arranged in this order from the rotation axis J.

A space H1 between the moving element 30 and the fixed electrode in the first gap 61 is narrower than a space H2 in the second gap 62. That is, the space between the moving element 30 and the fixed electrode becomes broader in order of the first gap 61, the second gap 62, the third gap 63, and the fourth gap 64. Therefore, when the moving element 30 seesaws in response to the application of the acceleration Az in the Z-direction, the distal end of the third mass part 38 having the largest amount of displacement is less likely to come into contact with the bottom surface of the recess 21c having the broadest space from the moving element 30. This can increase the range of detection of the acceleration Az. Also, since the space from the first mass part 36 and the second mass part 37 can be narrowed, the electrostatic capacitance value can be increased and the sensitivity of detection can be improved.

In this embodiment, three steps are provided on the substrate 2a. However, this is not limiting. Any number of steps equal to or greater than two may be provided. In this embodiment, the moving element 30 is not formed line-symmetrically about the rotation axis J. However, this is not limiting. The moving element 30 may have a line-symmetric structure, provided that the first mass part 36 and the second mass part 37 have different masses to generate a moment of rotation.

Figure 3:
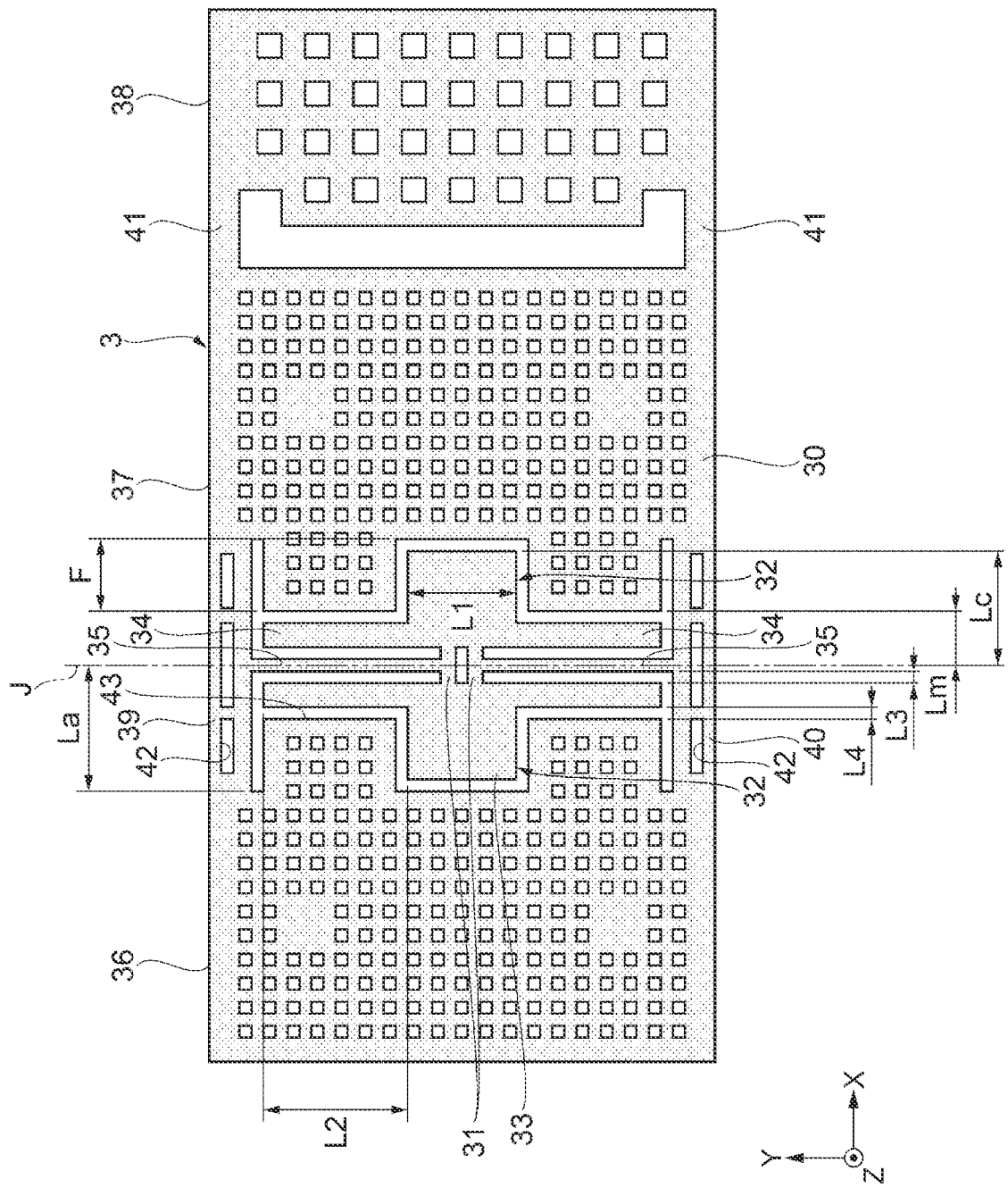
FIG. 3 is a plan view showing a schematic structure of a sensor element.

In FIG. 3, a part of the moving element 30 within a range F from the end part facing the second part 34 of the moving element 30 to the end part facing the first part 33 of the moving element 30 overlaps the fixed electrode, as viewed in a plan view from the Z-direction orthogonal to the X-direction and the Y-direction. Therefore, compared with when the overlap with the fixed electrode is only up to the end part facing the first part 33 of the moving element 30, the electrostatic capacitance value can be increased and the sensitivity of detection can be improved.

According to this embodiment, the amount of displacement of the moving element 30 can be increased, in addition to the effects of the first embodiment. Therefore, the range of detection of the acceleration Az can be increased. Also, since the electrostatic capacitance value between the detection electrode and the fixed electrode can be increased, the sensitivity of detection can be improved.

In this embodiment, steps are provided on the substrate 2a. However, this is not limiting. Steps may be provided on the lid 5 in such a way that the space between the lid 5 and the moving element 30 increases as it goes away from the rotation axis J.

3. Third Embodiment

An inertial sensor 1b according to a third embodiment will now be described with reference to FIGS. 6 and 7. FIG.

6 shows the state where the lid 5 is removed for the sake of convenience of the description of the internal configuration of the inertial sensor 1b.

The inertial sensor 1b according to this embodiment is similar to the inertial sensor 1 according to the first embodiment, except that the structure of a substrate 2b and the structure of a sensor element 3b are different from those in the inertial sensor 1 according to the first embodiment. This embodiment is described mainly in terms of its difference from the first embodiment. The description of similar matters is omitted.

Figure 6:
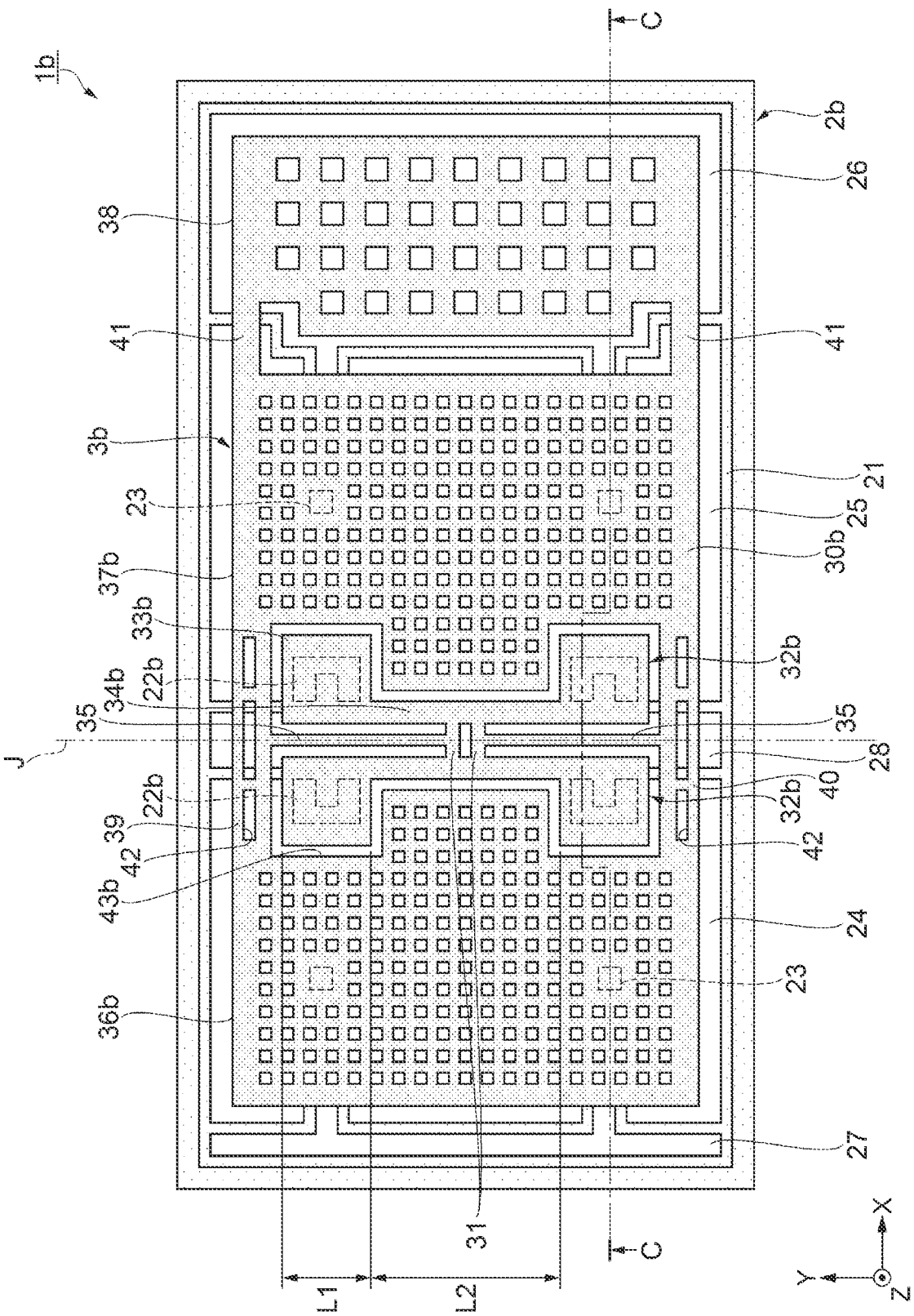
FIG. 6 is a plan view showing a schematic structure of an inertial sensor according to a third embodiment.
Figure 7:
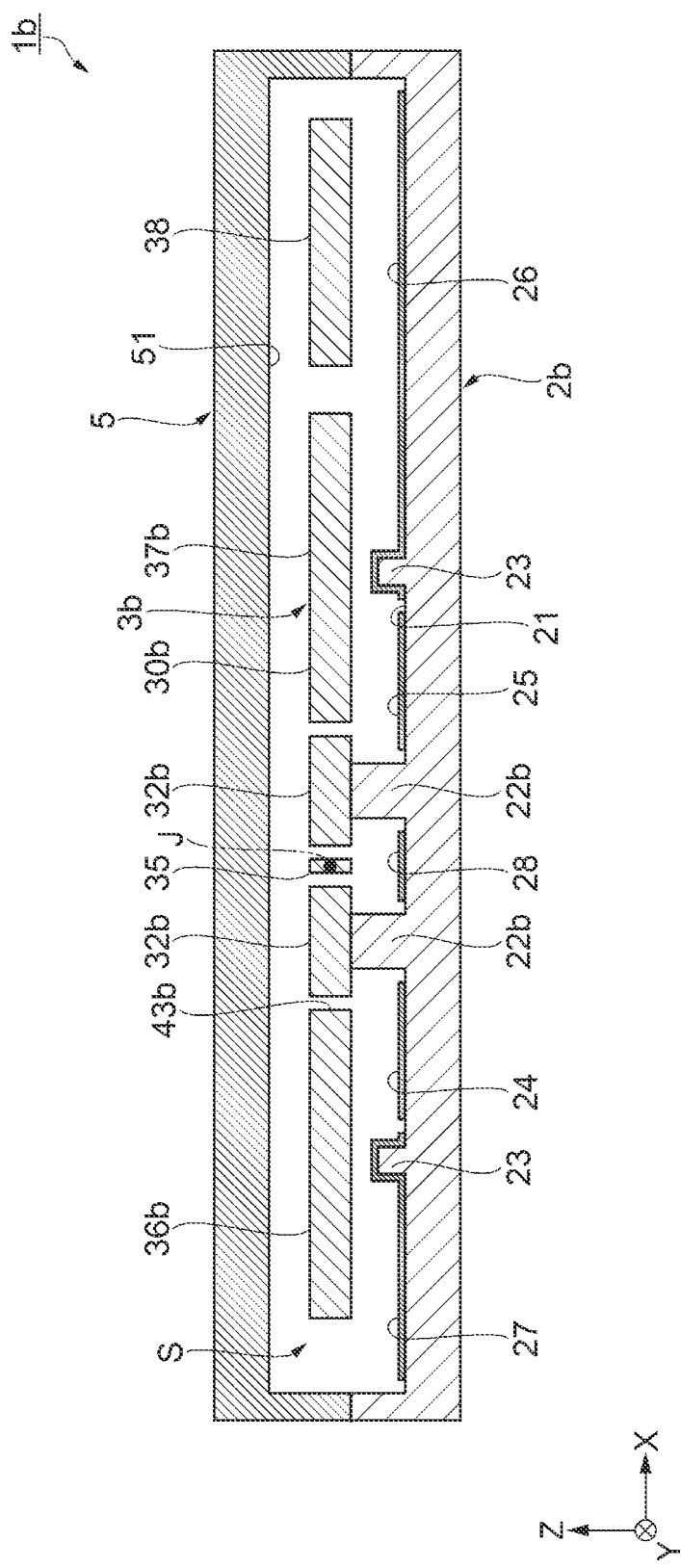
FIG. 7 is a cross-sectional view taken along line C-C in FIG. 6.

As shown in FIGS. 6 and 7, the substrate 2b of the inertial sensor 1b has four fixing parts 22b arranged at the bottom surface of a recess 21 and protruding toward the sensor element 3b from the bottom surface. The four fixing parts 22b are line-symmetrically arranged about the rotation axis J as a centerline and also line-symmetrically arranged about a centerline in a direction orthogonal to the rotation axis J, as viewed in a plan view from the Z-direction. At the bottom surface of the recess 21 facing a first mass part 36b, a second mass part 37b, and a third mass part 38 of the sensor element 3b, a first detection electrode 24, a second detection electrode 25, and a dummy electrode 26 are arranged respectively.

The sensor element 3b has a moving element 30b having an opening 43b and configured to swing about the rotation axis J along the Y-direction, a support beam 35 supporting the moving element 30b as the rotation axis J in the opening 43b of the moving element 30b, and a support part 32b supporting the support beam 35.

The opening 43b of the moving element 30b is formed by the first mass part 36b and the second mass part 37b arranged on both sides of the rotation axis J, and a first coupling part 39 and a second coupling part 40 coupling the first mass part 36b and the second mass part 37b together.

Each of the two support parts 32b has a plurality of first parts 33b arranged next to each other along the Y-direction. That is, the two support parts 32b have four first parts 33b arranged on both sides of the rotation axis J and each including an area fixed to the fixing part 22b at a position overlapping the fixing part 22b as viewed in a plan view from the Z-direction, and a second part 34b that is arranged between two first parts 33b arranged line-symmetrically about a center ling in a direction orthogonal to the rotation axis J, of the four first parts 33b, and that couples the two first parts 33b together, is formed only of a part not fixed to the fixing part 22b, and extends in the Y-direction. The length L2 in the Y-direction of the second part 34b is longer than the length L1 in the Y-direction of the first part 33b. Preferably, the length in the Y-direction of the second part 34b is longer than the total length in the Y-direction of the first parts 33b arranged next to each other along the Y-direction with the second part 34b. However, this is not limiting.

Each of the two support beams 35 is coupled to a coupling beam 31 coupling two support parts 32b at the second part 34b, and to the first coupling part 39 and the second coupling part 40. Therefore, the moving element 30b can swing about the support beams 35 as the rotation axis J.

According to this embodiment, when an impact in the in-plane direction is applied, the four first parts 33b come into contact with the first mass part 36b and the second mass part 37b, and this can restrain the displacement of the moving element 30b and improve in-place impact resistance, in addition to the effects of the first embodiment.

4. Fourth Embodiment

Figure 8:
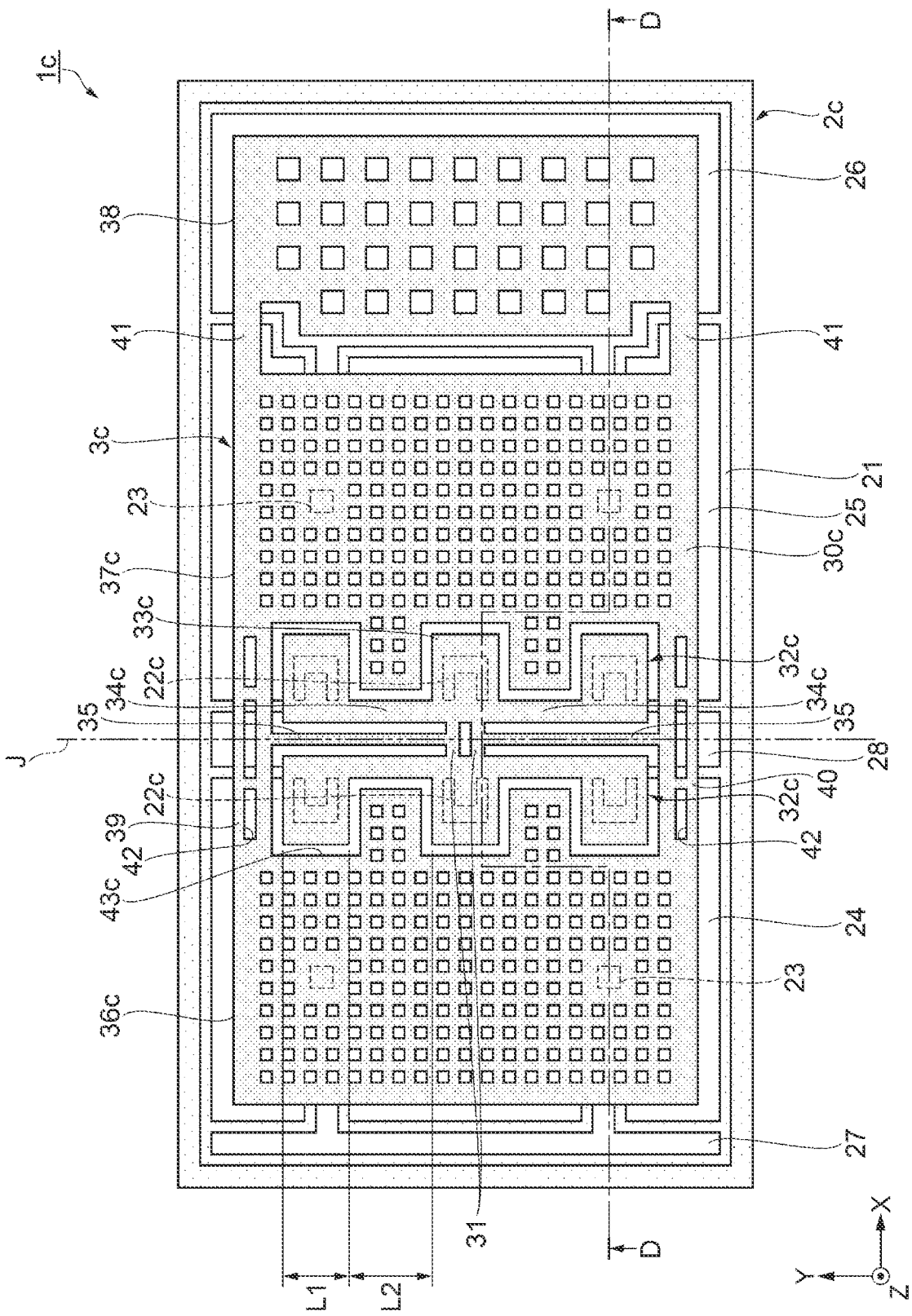
FIG. 8 is a plan view showing a schematic structure of an inertial sensor according to a fourth embodiment.
Figure 9:
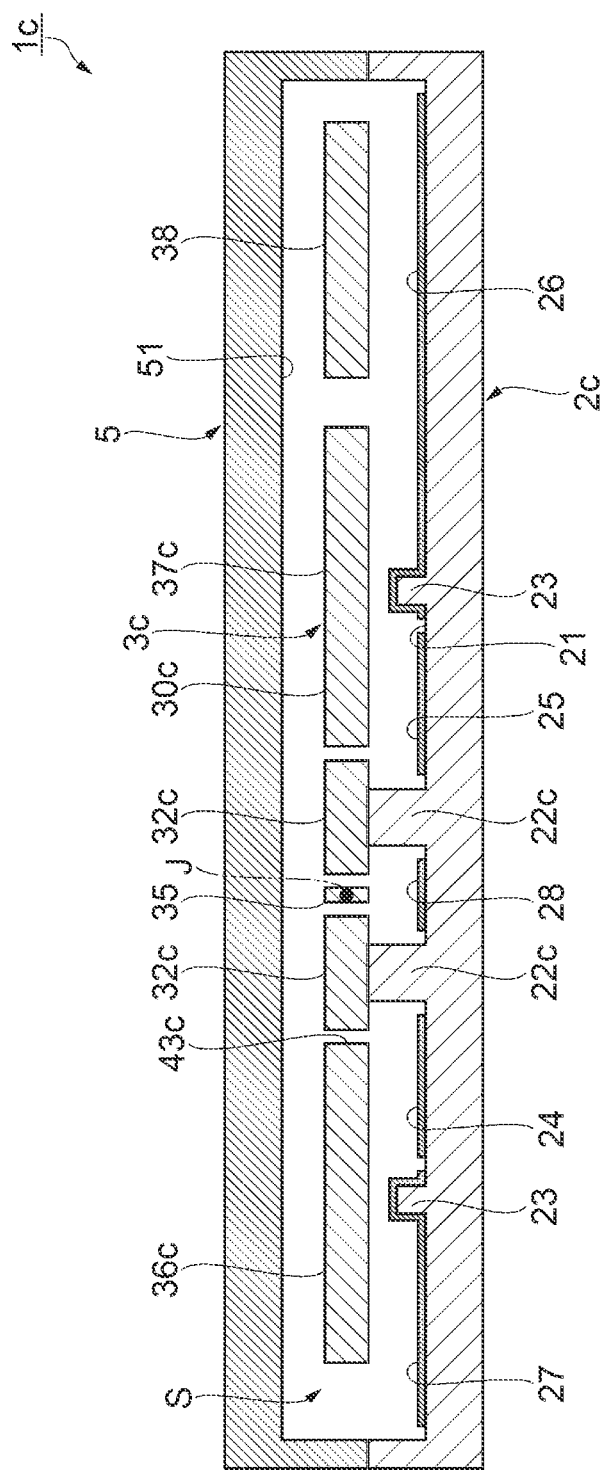
FIG. 9 is a cross-sectional view taken along line D-D in FIG. 8.

An inertial sensor 1c according to a fourth embodiment will now be described with reference to FIGS. 8 and 9. FIG. 8 shows the state where the lid 5 is removed for the sake of convenience of the description of the internal configuration of the inertial sensor 1c.

The inertial sensor 1c according to this embodiment is similar to the inertial sensor 1 according to the first embodiment, except that the structure of a substrate 2c and the structure of a sensor element 3c are different from those in the inertial sensor 1 according to the first embodiment. This embodiment is described mainly in terms of its difference from the first embodiment. The description of similar matters is omitted.

The sensor element 3c of the inertial sensor 1c has two support parts 32c, each having a plurality of first parts 33c arranged next to each other along the Y-direction. The substrate 2c of the inertial sensor 1c has six fixing parts 22c arranged at the bottom surface of a recess 21 and protruding toward the sensor element 3c from the bottom surface, as shown in FIGS. 8 and 9. The six fixing parts 22c are arranged line-symmetrically about the rotation axis J as a centerline and also arranged line-symmetrically about a centerline in a direction orthogonal to the rotation axis J, as viewed in a plan view from the Z-direction. At the bottom surface of the recess 21 facing a first mass part 36c, a second mass part 37c, and a third mass part 38 of the sensor element 3c, a first detection electrode 24, a second detection electrode 25, and a dummy electrode 26 are arranged respectively.

The sensor element 3c has a moving element 30c having an opening 43c and configured to swing about the rotation axis J along the Y-direction, a support beam 35 supporting the moving element 30c as the rotation axis J in the opening 43c of the moving element 30c, and a support part 32c supporting the support beam 35.

The opening 43c of the moving element 30c is formed by the first mass part 36c and the second mass part 37c arranged on both sides of the rotation axis J, and a first coupling part 39 and a second coupling part 40 coupling the first mass part 36c and the second mass part 37c together.

Each of the two support parts 32c has first parts 33c arranged on both sides of the rotation axis J and each being fixed to the fixing part 22c at a position overlapping the fixing part 22c as viewed in a plan view from the Z-direction, and second parts 34c that couple the first part 33c at the center to the first part 33c located on the positive side along the Y-direction and to the first part 33c located on the negative side along the Y-direction, of the three first parts 33c arranged next to each other along the Y-direction, and that are formed only of a part not fixed to the fixing part 22c and extends in the Y-direction. The length L2 in the Y-direction of the second part 34c is longer than the length L1 in the Y-direction of the first part 33c. The relationship of L2>L1 may be established between one or more first parts 33c and one or more second pars 34c, of the plurality of first parts 33c arranged next to each other along the Y-direction and the plurality of second parts 34c. Preferably, the total length in the Y-direction of the second parts 34c is longer than the total length in the Y-direction of the first parts 33c arranged next to each other along the Y-direction with the second parts 34c. However, this is not limiting.

Each of the two support beams 35 is coupled to a coupling beam 31 coupling the two first parts 33c located at the center, and to the first coupling part 39 and the second coupling part 40. Therefore, the moving element 30c can swing about the support beams 35 as the rotation axis J.

According to this embodiment, when an impact in the in-plane direction is applied, the four first parts 33c arranged in the four corners of the opening 43c come into contact with the first mass part 36c and the second mass part 37c, and this can restrain the displacement of the moving element 30c and improve in-place impact resistance, in addition to the effects of the first embodiment.

5. Fifth Embodiment

Figure 10:
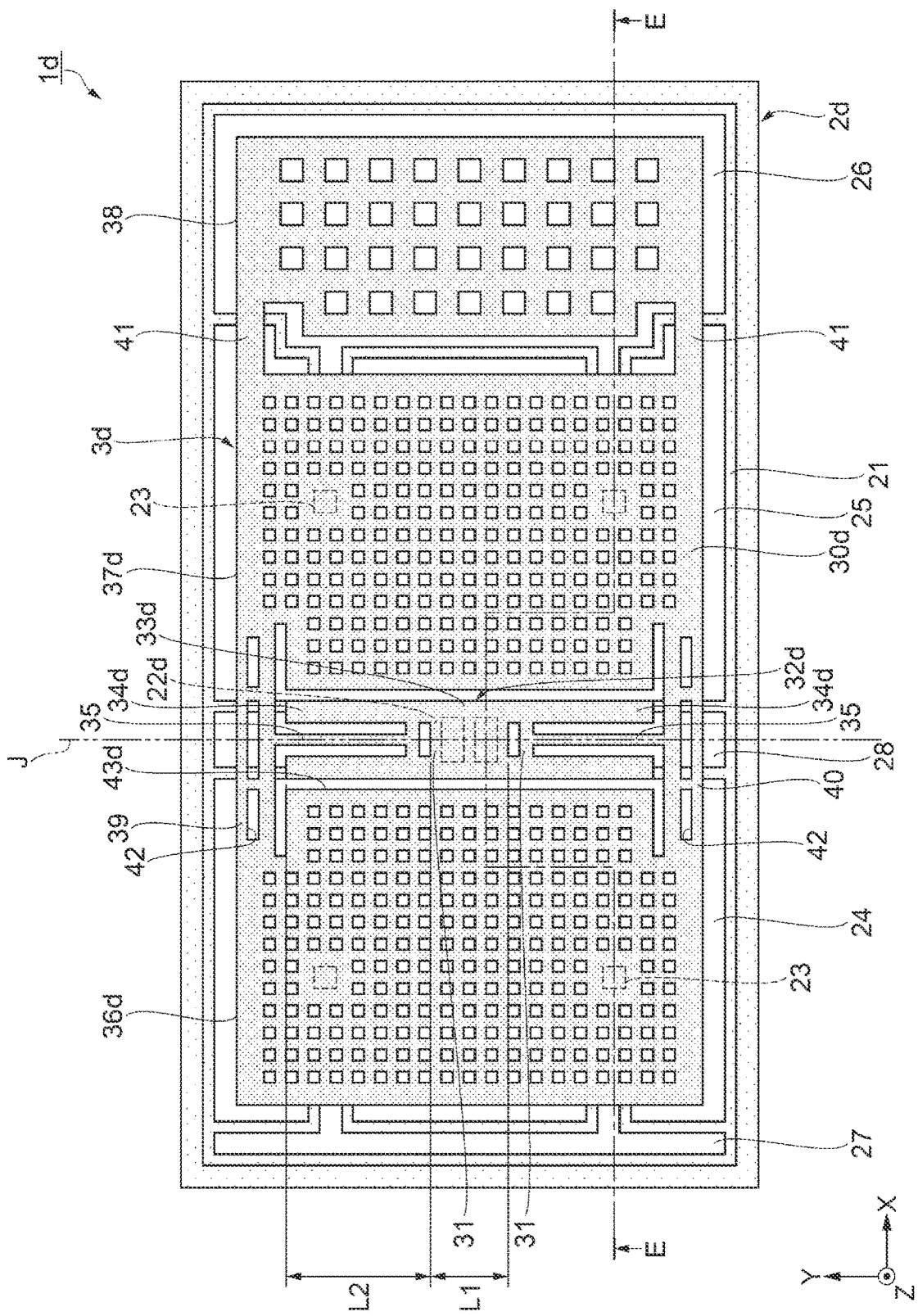
FIG. 10 is a plan view showing a schematic structure of an inertial sensor according to a fifth embodiment.

An inertial sensor 1d according to a fifth embodiment will now be described with reference to FIGS. 10 and 11. FIG. 10 shows the state where the lid 5 is removed for the sake of convenience of the description of the internal configuration of the inertial sensor 1d.

The inertial sensor 1d according to this embodiment is similar to the inertial sensor 1 according to the first embodiment, except that the structure of a substrate 2d and the structure of a sensor element 3d are different from those in the inertial sensor 1 according to the first embodiment. This embodiment is described mainly in terms of its difference from the first embodiment. The description of similar matters is omitted.

Figure 11:
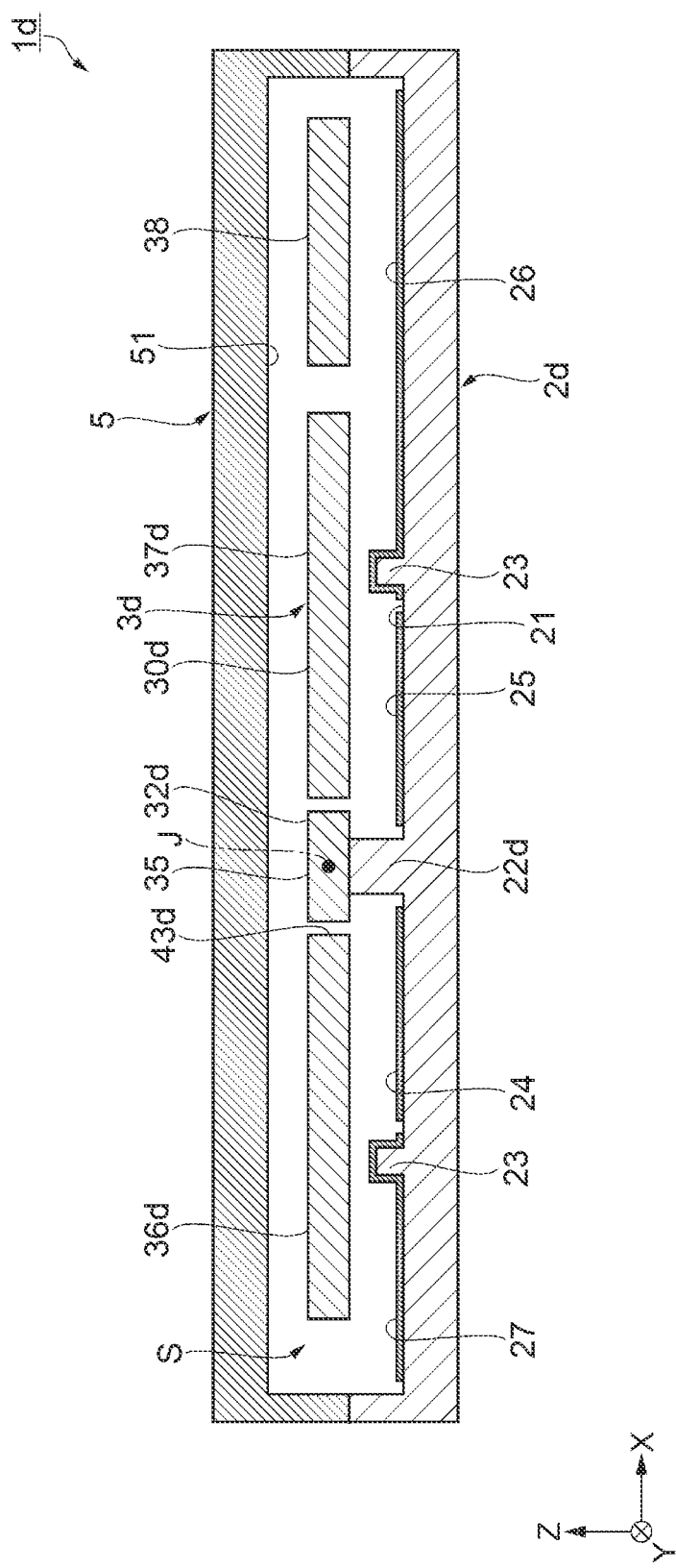
FIG. 11 is a cross-sectional view taken along line E-E in FIG. 10.

As shown in FIGS. 10 and 11, the substrate 2d of the inertial sensor 1d has a fixing part 22d arranged at the bottom surface of a recess 21 and protruding toward the sensor element 3d from the bottom surface. The fixing part 22d is arranged at the center in the Y-direction of the recess 21, as viewed in a plan view from the Z-direction. At the bottom surface of the recess 21 facing a first mass part 36d, a second mass part 37d, and a third mass part 38 of the sensor element 3d, a first detection electrode 24, a second detection electrode 25, and a dummy electrode 26 are arranged respectively. In this embodiment, a support part 32d of the sensor element 3d is fixed by two fixing parts 22d. However, the number of fixing parts 22d may be one.

The sensor element 3d has a moving element 30d having an opening 43d and configured to swing about the rotation axis J along the Y-direction, a support beam 35 supporting the moving element 30d as the rotation axis J in the opening 43d of the moving element 30d, and a support part 32d supporting the support beam 35.

The opening 43d of the moving element 30d is formed by the first mass part 36d and the second mass part 37d arranged on both sides of the rotation axis J, and a first coupling part 39 and a second coupling part 40 coupling the first mass part 36d and the second mass part 37d together.

The support part 32d has a first part 33d fixed to the fixing part 22d at a position overlapping the fixing part 22d as viewed in a plan view from the Z-direction, and two second parts 34d extending to the positive side along the Y-direction from both ends on the positive side along the Y-direction of the first part 33d and two second parts 34d extending to the negative side along the Y-direction from both ends on the negative side along the Y-direction of the first part 33d, the second parts 34d being formed only of a part not fixed to the fixing part 22d. The first part 33d is located on the rotation axis J. Therefore, the length in the X-direction of the sensor element 3d can be reduced. The length L2 in the Y-direction of the second part 34d is the distance from the first part 33d to the distal end of the second part 34d and is longer than the length L1 in the Y-direction of the first part 33d.

Each of the two support beams 35 is coupled to a coupling beam 31 coupling two second parts 34d of the support part 32d, and to the first coupling part 39 and the second coupling part 40. Therefore, the moving element 30d can swing about the support beams 35 as the rotation axis J.

According to this embodiment, since the first part 33d of the support part 32d is located on the rotation axis J, the length in the X-direction of the sensor element 3d can be reduced and therefore the inertial sensor 1d can be miniaturized, in addition to the effects of the first embodiment.

6. Sixth Embodiment

An inertial measurement unit 2000 having one of the inertial sensors 1 to 1d according to a sixth embodiment will now be described with reference to FIGS. 12 and 13. In the description below, a configuration employing the inertial sensor 1 is described as an example.

Figure 12:
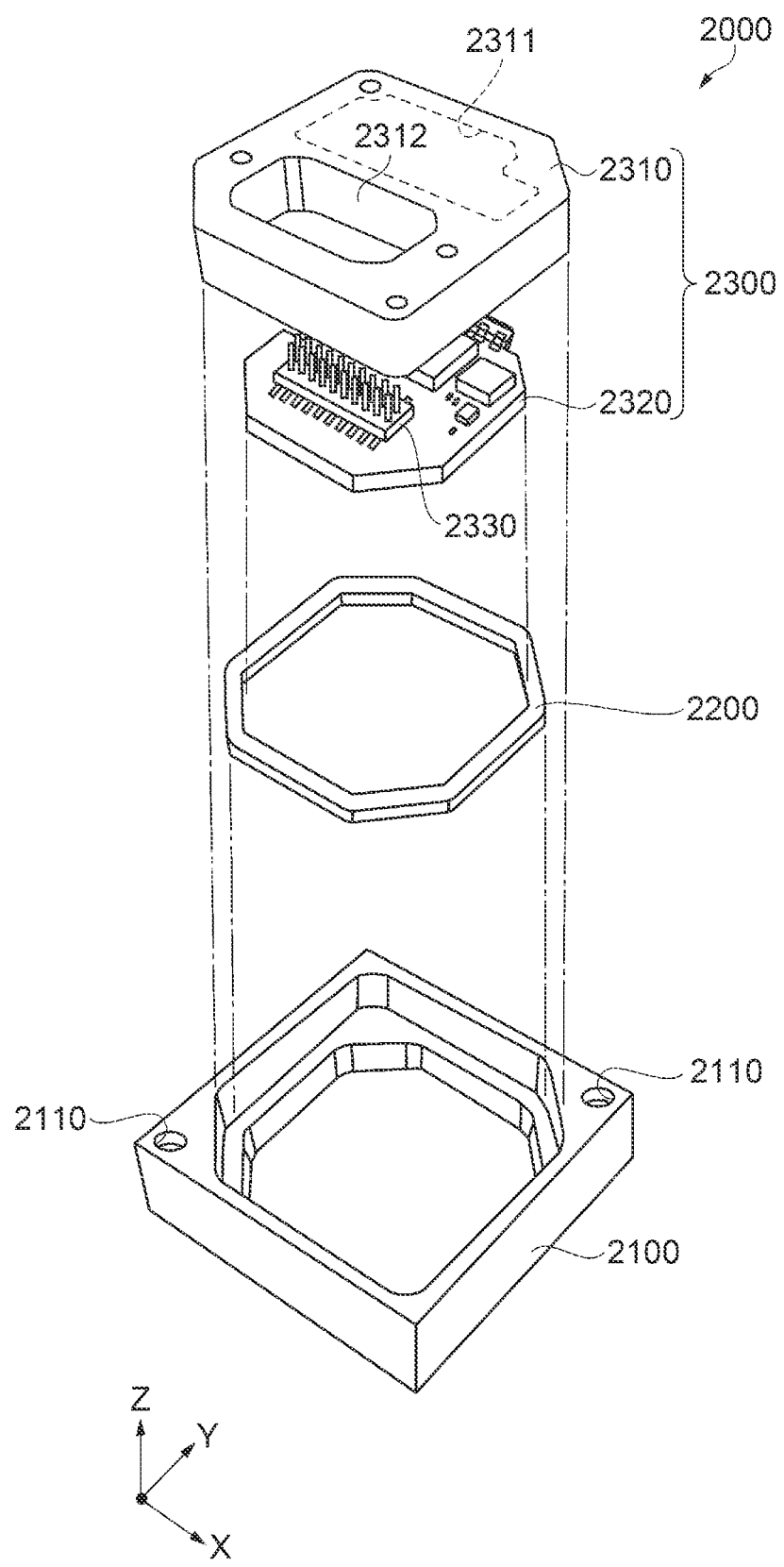
FIG. 12 is an exploded perspective view showing a schematic configuration of an inertial measurement unit having an inertial sensor according a sixth embodiment.

The inertial measurement unit 2000 (IMU) shown in FIG. 12 is a device detecting an amount of inertial motion such as an attitude or a behavior of a moving body such as an automobile or a robot. The inertial measurement unit 2000 functions as a so-called 6-axis motion sensor having an acceleration sensor detecting accelerations Ax, Ay, Az in directions along three axes and an angular velocity sensor detecting angular velocities ωx, ωy, ωz about the three axes.

The inertial measurement unit 2000 is a rectangular parallelepiped having a substantially square planar shape. A screw hole 2110 as a fixing part is formed near two vertices located along a diagonal line of the square. Two screws can be inserted into the two screw holes 2110 to fix the inertial measurement unit 2000 to an installation target surface of an installation target object such as an automobile. Properly selecting components or changing design enables miniaturization of the inertial measurement unit 2000 into a size that can be installed, for example, in a smartphone or a digital camera.

The inertial measurement unit 2000 has an outer case 2100, a bonding member 2200, and a sensor module 2300. The sensor module 2300 is inserted in the outer case 2100 via the bonding member 2200. The sensor module 2300 has an inner case 2310 and a substrate 2320.

The outer shape of the outer case 2100 is a rectangular parallelepiped having a substantially square planar shape, similarly to the overall shape of the inertial measurement unit 2000. The screw hole 2110 is formed near two vertices along a diagonal line of the square. The outer case 2100 is in the shape of a box, with the sensor module 2300 accommodated inside.

The inner case 2310 is a member supporting the substrate 2320 and has a shape to fit inside the outer case 2100. In the inner case 2310, a recess 2311 for preventing contact with the substrate 2320 and an opening 2312 for exposing a connector 2330, described later, are formed. Such an inner case 2310 is bonded to the outer case 2100 via the bonding member 2200. The substrate 2320 is bonded to a lower surface of the inner case 2310 via an adhesive.

Figure 13:
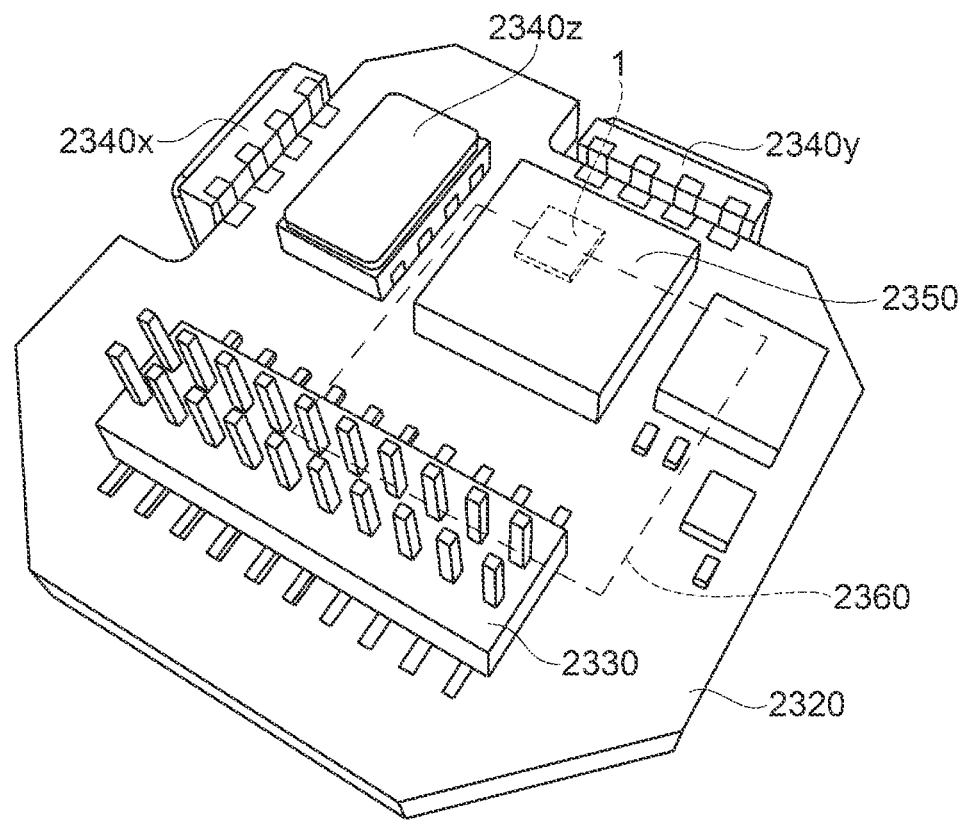
FIG. 13 is a perspective view of a substrate shown in FIG. 12.

As shown in FIG. 13, components such as the connector 2330, an angular velocity sensor 2340z detecting an angular velocity about the Z-axis, and an acceleration sensor unit 2350 detecting an acceleration in each of the X-axis, Y-axis, and Z-axis directions, are installed at an upper surface of the substrate 2320. At lateral surfaces of the substrate 2320, an angular velocity sensor 2340x detecting an angular velocity about the X-axis and an angular velocity sensor 2340y detecting an angular velocity about the Y-axis are installed.

The acceleration sensor unit 2350 includes at least the inertial sensor 1 for measuring an acceleration in the Z-direction and can detect an acceleration in one axial direction or accelerations in two or three axial directions according to need. The angular velocity sensors 2340x, 2340y, 2340z are not particularly limited. For example, a vibration gyro sensor utilizing a Coriolis force can be used.

A control IC 2360 is installed at a lower surface of the substrate 2320. The control IC 2360, which is a control unit performing control based on a detection signal outputted from the inertial sensor 1, is an MCU (micro controller unit). The control IC 2360 has a storage unit including a non-volatile memory, an A/D converter and the like built inside, and controls each part of the inertial measurement unit 2000. In the storage unit, a program prescribing an order and a content for detecting an acceleration and an angular velocity, a program for digitizing and incorporating detection data into packet data, and accompanying data and the like are stored. In addition, a plurality of other electronic components are installed at the substrate 2320.

Such an inertial measurement unit 2000 uses the acceleration sensor unit 2350 including the inertial sensor 1 and therefore achieves high impact resistance and high reliability.

What is claimed is:

1. An inertial sensor comprising:
a substrate;
a fixing part arranged at one surface of the substrate;
a moving element having an opening and configured to swing about a rotation axis along a first direction;
a support beam supporting the moving element as the rotation axis in the opening of the moving element; and
a support part supporting the support beam, wherein
the support part includes a first part fixed to the fixing part, and a second part formed only of a part not fixed to the fixing part,
a length in the first direction of the second part is longer than a length in the first direction of the first part,
the substrate has a fixed electrode arranged at the one surface, and
the moving element is arranged, spaced apart from the fixed electrode via a first gap and a second gap having different spaced from each other between the moving element and the fixed electrode of the gap, in an area where the moving element faces the fixed electrode.

2. The inertial sensor according to claim 1, wherein
in the support part, a plurality of the first parts and a plurality of the second parts are provided next to each other along the first direction.

3. The inertial sensor according to claim 1, wherein
in the support part, a total length in the first direction of the second part is longer than a total length in the first direction of the first part.

4. The inertial sensor according to claim 1, further comprising:
a first mass part and a second mass part arranged on both sides of the support beam; and
a first coupling part and a second coupling part coupling the first mass part and the second mass part together and coupled to the support beam, wherein
the second part is located between the first part and the first coupling part and between the first part and the second coupling part.

5. The inertial sensor according to claim 1, wherein
a length in a second direction orthogonal to the first direction from an end part facing the second part, of the moving element, to the rotation axis, is shorter than a length in the second direction from an end part opposite to the side of the rotation axis, of the first part, to the rotation axis.

6. The inertial sensor according to claim 5, wherein
a length in the second direction from the rotation axis to an end part on the side of the moving element, of the first coupling part and the second coupling part, is longer than a length in the second direction from the rotation axis to the end part facing the second part, of the moving element.

7. The inertial sensor according to claim 1, wherein
the first part is located on the rotation axis.

8. The inertial sensor according to claim 1, wherein
the first gap is arranged nearer to the rotation axis than the second gap, and
the space of the first gap is narrower than the space of the second gap.

9. The inertial sensor according to claim 1, wherein
a part of the moving element within a range from the end part facing the second part, of the moving element, to an end part facing the first part, of the moving element, overlaps the fixed electrode, as viewed in a plan view from a third direction orthogonal to the first direction and the second direction.

10. An inertial measurement unit comprising:
the inertial sensor according to claim 1; and
a control unit performing control based on a detection signal outputted from the inertial sensor.

11. An inertial sensor comprising:
a substrate;
a fixing part arranged at one surface of the substrate;
a moving element having an opening and configured to swing about a rotation axis along a first direction;
a support beam supporting the moving element as the rotation axis in the opening of the moving element; and
a support part supporting the support beam, wherein
the support part includes a plurality of first parts fixed to the fixing part, and a plurality of second parts formed only of a part not fixed to the fixing part,
a length in the first direction of one second part, of the plurality of second parts, is longer than a length in the first direction of one first part, of the plurality of first parts,
the substrate has a fixed electrode arranged at the one surface, and
the moving element is arranged, spaced apart from the fixed electrode via a first gap and a second gap having different spaced from each other between the moving element and the fixed electrode of the gap, in an area where the moving element faces the fixed electrode.

12. An inertial sensor comprising:
a substrate;
a fixing part arranged at one surface of the substrate;
a moving element having an opening and configured to swing about a rotation axis along a first direction;
a support beam supporting the moving element as the rotation axis in the opening of the moving element; and
a support part supporting the support beam, wherein
the support part includes a plurality of first parts fixed to the fixing part, and a plurality of second parts formed only of a part not fixed to the fixing part, in the support part, the plurality of first parts and the plurality of second parts are provided next to each other along the first direction,
in the support part, a total length in the first direction of the plurality of second parts is longer than a total length in the first direction of the plurality of first parts,
the substrate has a fixed electrode arranged at the one surface, and
the moving element is arranged, spaced apart from the fixed electrode via a first gap and a second gap having different spaced from each other between the moving element and the fixed electrode of the gap, in an area where the moving element faces the fixed electrode.

* * * * *